(12) United States Patent
Inujima et al.

(10) Patent No.: US 6,600,611 B2
(45) Date of Patent: Jul. 29, 2003

(54) OPTICAL MODULE

(75) Inventors: Takayoshi Inujima, Yokohama (JP);
Eiji Tsumura, Yokohama (JP); Hiromi Kurashima, Yokohama (JP); Kazushige Oki, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/104,003

(22) Filed: Mar. 25, 2002

(65) Prior Publication Data

US 2003/0063397 A1 Apr. 3, 2003

(30) Foreign Application Priority Data

Sep. 28, 2001 (JP) ..................... P2001-301339

(51) Int. Cl.[7] ............. G02B 7/02; G02B 6/36; H04B 10/00
(52) U.S. Cl. .............. 359/808; 359/811; 359/152; 359/154; 385/53; 385/60; 385/88; 385/89; 385/93
(58) Field of Search .............. 359/808, 811, 359/152, 154, 161, 179; 385/33, 35, 53, 58, 60, 88, 89, 92, 93

(56) References Cited

U.S. PATENT DOCUMENTS

| | | | | |
|---|---|---|---|---|
| 4,737,008 A | * | 4/1988 | Ohyama et al. | 385/93 |
| 4,798,440 A | * | 1/1989 | Hoffer et al. | 385/89 |
| 5,005,939 A | | 4/1991 | Arvanitakis et al. | 385/53 |
| 5,852,517 A | * | 12/1998 | Gerber et al. | 359/811 |
| 6,027,252 A | * | 2/2000 | Erdman et al. | 385/53 |
| 6,341,899 B1 | * | 1/2002 | Shirakawa et al. | 385/88 |
| 6,364,535 B1 | * | 4/2002 | Coffey | 385/53 |
| 6,367,984 B1 | * | 4/2002 | Stephenson et al. | 385/53 |
| 6,389,212 B1 | * | 5/2002 | Yamagata | 385/53 |
| 6,422,760 B1 | * | 7/2002 | Matasek et al. | 385/60 |
| 6,540,412 B2 | * | 4/2003 | Yonemura et al. | 385/88 |

* cited by examiner

Primary Examiner—Loha Ben
(74) Attorney, Agent, or Firm—McDermott, Will & Emery

(57) ABSTRACT

A light-receiving device unit (as with a light-emitting device unit) has a body accommodated in a cylindrical hole in a housing, and a flange part secured by being pressed toward an end face of the housing by a protrusion of a bracket holder. The bracket holder comprises a tilted wall corresponding to an inclined wall of the housing, and reliably presses the light-receiving device unit while being slid along a slope when being inserted. Also, it engages an abutment of the housing by using a claw at the leading end of the protrusion.

3 Claims, 16 Drawing Sheets

OPTICAL MODULE

BACKGROUND OF THE INVENTION

1. Field of the Invention

The present invention relates to an optical module utilized in an optical transceiver and the like for linking and unlinking.

2. Related Background Art

In high-speed LANs (Local Area Networks), optical transceivers have widely been in use as a module for converting digital electric signals and optical signals to each other. In order to attain a higher density in ports of hub apparatus and the like using such optical transceivers, SFF (Small Form Factor) has been known as a unified standard enabling a smaller size. While such SFF optical transceivers are characterized by their small size and low power consumption, SFP (Small Form Factor Pluggable) optical transceivers making electric connectors attachable thereto and detachable therefrom without stopping devices have further been developed.

SUMMARY OF THE INVENTION

As LANs attain a higher speed, digital signals transmitted by such an SFF or SFP optical transceiver have been shifting to a gigabit band. It is necessary for SFP optical transceivers to restrain performances from deteriorating upon attaching/detaching, since they are assumed to be subjected to a number of attaching/detaching operations. In an SFP optical transceiver, a circuit board, a light-emitting device unit, and a light-receiving device unit are arranged like a single line, whereas the attaching/detaching direction of optical and electric connectors aligns with this line, whereby stresses applied to the connecting parts between the circuit board and the light-emitting/receiving device unit may vary upon attaching/detaching, thus yielding fear of breakage and deterioration.

Therefore, it is an object of the present invention to provide an optical module used in an optical transceiver and the like, which can restrain its characteristics from deteriorating even when attaching/detaching operations are repeated.

For achieving the above-mentioned object, the present invention provides an optical module comprising, within a housing, a substrate having an electronic circuit, and light-emitting and light-receiving device units each having an optical output or input end connected to the electronic circuit; wherein the light-emitting device unit and the light-receiving device unit have respective cylindrical leading end parts accommodated in substantially cylindrical holes within the housing and respective flange parts having diameters greater than those of the leading end parts, the housing having an inclined wall behind the substantially cylindrical holes; and wherein the optical module further comprises a pressing member having a protrusion for pressing the flange parts of the light-emitting device unit and light-receiving device unit against the housing so as to secure said units, the pressing member engaging the housing while being slid along the inclined wall of the housing by a slanted wall provided so as to correspond to the inclined wall.

As a consequence of such a configuration, the light-emitting device unit and the light-receiving device unit are pressed and secured within the housing by the pressing member. Therefore, the force received by the light-emitting/receiving device unit upon attaching/detaching optical connection is absorbed by the pressing member, and thus is not transmitted to the connecting part with respect to the electronic circuit, where by breakage and the deterioration of connecting parts can be prevented from occurring. Hence, performances can be restrained from deteriorating upon attaching/detaching.

Preferably, the pressing member engages a cutout of the housing by way of an elastic protrusion having a claw at a leading end thereof. This enables reliable engagement.

Preferably, the tilted wall has a wall face forming an angle of 40° to 80° with respect to a horizontal plane of the substrate. As a consequence, the light-emitting device unit and the light-receiving device unit can reliably be pressed when attaching the pressing member.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 2A is a view showing the light-emitting device unit of the apparatus of FIG. 1, whereas

FIG. 5 is a perspective view showing the bracket holder in the apparatus of FIG. 1, whereas

FIGS. 9, 10, and 11A are views for explaining the state where the light-emitting device, light-receiving device, circuit board, and the like are attached to the housing in the apparatus of FIG. 1, the state where the bracket is attached thereto, and the state where the bracket holder is attached thereto, respectively, whereas

FIG. 12 is a graph showing EMI test results comparing the apparatus of FIG. 1 with a conventional apparatus, whereas

FIG. 15A is a chart showing a waveform transmitted by the apparatus of FIG. 1, whereas FIG. 16 is a graph showing changes in characteristics vs. the number of connector attaching/detaching operations in the apparatus of FIG. 1, whereas

DETAILED DESCRIPTION OF THE PREFERRED EMBODIMENTS

In the following, preferred embodiments of the present invention will be explained in detail with reference to the accompanying drawings. For making it easier to understand the explanation, constituents identical to each other among the drawings will be referred to with numerals identical to each other whenever possible, without repeating their overlapping descriptions.

Figure 1:
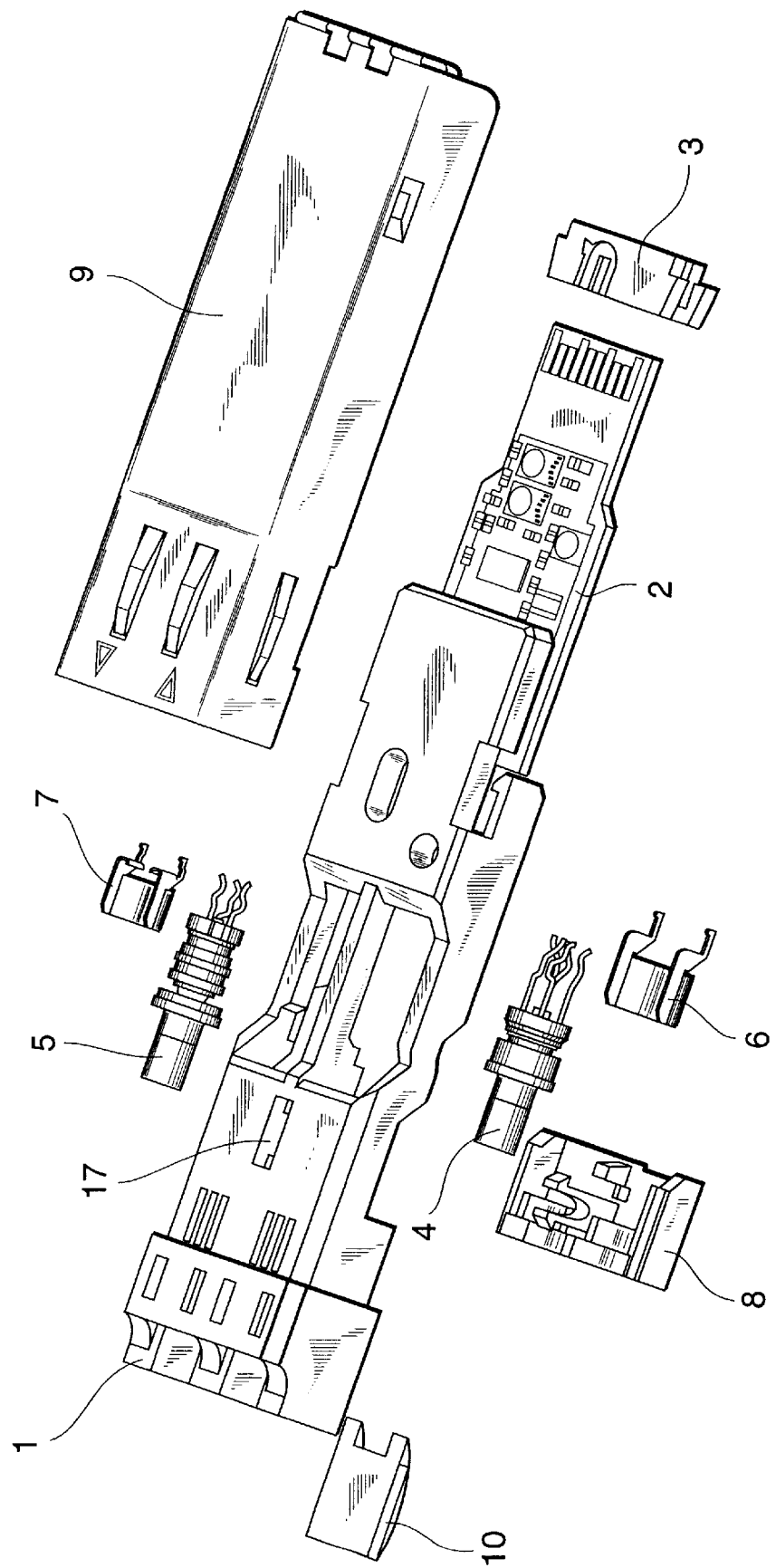
FIG. 1 is an exploded view showing components of an optical module (optical transceiver) in accordance with the present invention.

FIG. 1 is a view showing an optical transceiver, which is an optical module in accordance with the present invention, in an exploded state such that its components can be understood easily. This optical transceiver is an SFP type optical transceiver having an elongated form with a substantially rectangular cross section, whose one end has an optical connector for connecting with respective optical fibers for transmission and reception, whereas the other end has an electric connector for inputting an electric power from the outside and transmitting/receiving an electric signal.

The optical transceiver contains, within a housing 1, a circuit board 2 mounted with an electronic circuit, and a light-receiving device unit 4 and a light-emitting device unit 5 which are connected to the circuit board 2. The light-receiving device unit 4 and light-emitting device unit 5 have their lead pin parts covered with respective metal brackets 6, 7 having an electric shielding function, and are secured to the housing 1 with a bracket holder 8 made of a resin. The circuit board 2 is secured to the housing 1 with a stopper 3, whereas the housing 1 is shrouded with the cover 9. The actuator 10 is disposed in the housing 1 near a side end part of the optical connector.

Configurations of the light-emitting device unit 5 and light-receiving device unit 4 will now be explained with reference to FIGS. 2A and 2B, respectively. In the light-receiving device unit 4, as shown in FIG. 2B, a metal enclosure 42 containing therewithin a light-receiving device (e.g., photodiode), an optical system, a preamplifier, and the like which are not depicted, and a resin ferrule 41 into which an optical fiber is inserted from the leading end thereof are integrated with each other. Five lead pins 43 each having a wavy leading end extend from the metal enclosure 42, among which lead pins 43a and 43b output a normal phase signal and an opposite phase signal which constitute complementary signals of an electric signal corresponding to a received optical signal, respectively. In the remaining three lead pins, a power voltage ($V_{ee}$) is supplied to lead pins 43c and 43e, whereas lead pin 43d is grounded (GND).

Figure 2A:
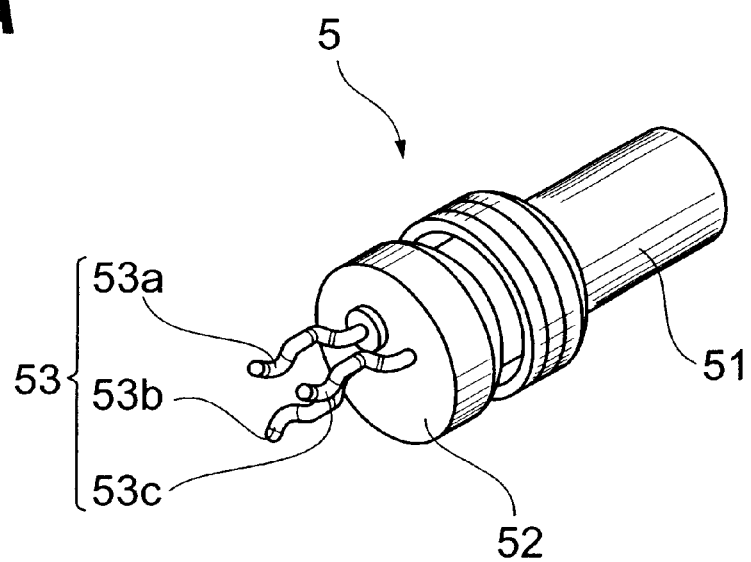
Figure 2B:
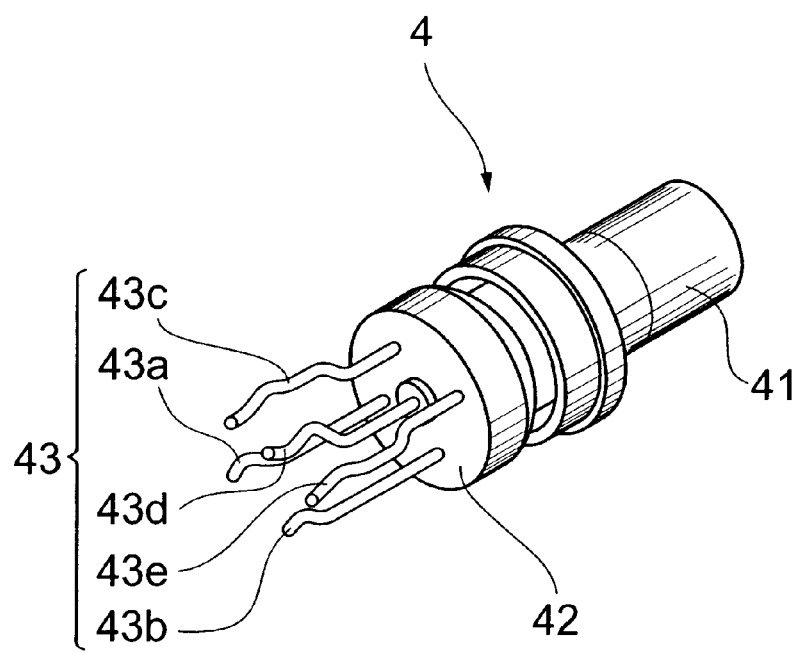
FIG. 2B is a view showing the light-receiving device unit thereof.

In the light-emitting device unit 5, as shown in FIG. 2A, a metal enclosure 52 containing therewithin a light-emitting device (e.g. laser diode), an optical system, and the like which are not depicted, and a resin ferrule 51 into which an optical fiber is inserted from the leading end thereof are integrated with each other. Three lead pins 53 each having a wavy leading end extend from the metal enclosure 52, among which an electric signal corresponding to the optical signal to be outputted is fed into lead pin 53c. The power $V_{cc}$ of the circuit board is supplied to lead pin 53a, whereas lead pin 53b acts as an output terminal. The voltage $V_{cc}$ may be made different from the voltage $V_{ee}$ supplied to the light-receiving device as well.

Figure 3A:
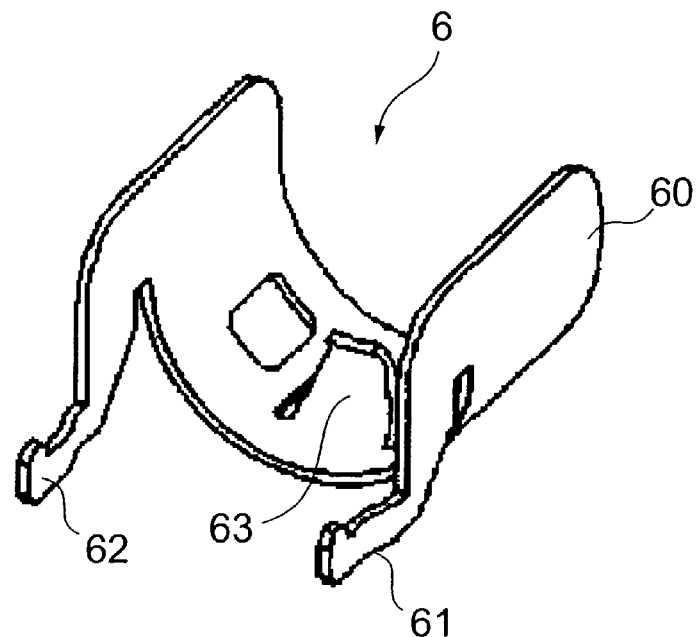
FIGS. 3A and 3B are perspective views showing the light-emitting device bracket in the apparatus of FIG. 1 at respective angles different from each other.
Figure 3B:
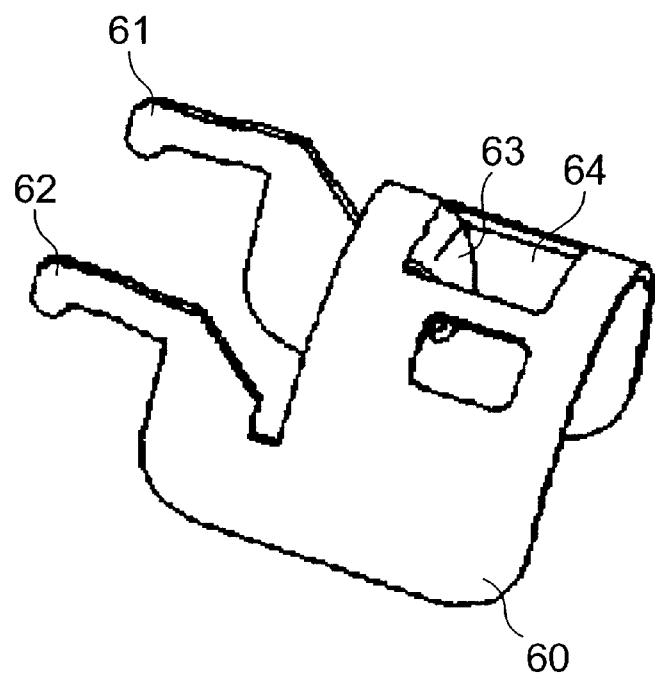

Structures of the brackets 6, 7 and bracket holder 8 will now be explained. As shown in FIGS. 3A and 3B, the light-receiving device bracket 6 has a form in which two legs 61, 62 project from a substantially semicylindrical body 60. The body 60 has a hole 64 substantially located at the center thereof, whereas a lug 63 is formed on the leg 61, 62 side of the hole 64 so as to be bent toward the inside of the body 60.

Figure 4A:
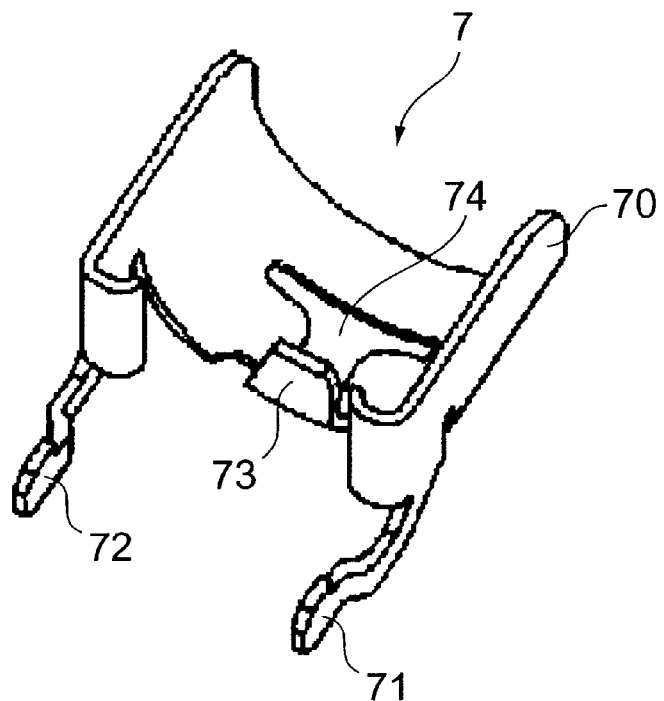
FIGS. 4A and 4B are perspective views showing the light-receiving device bracket in the apparatus of FIG. 1 at respective angles different from each other.
Figure 4B:
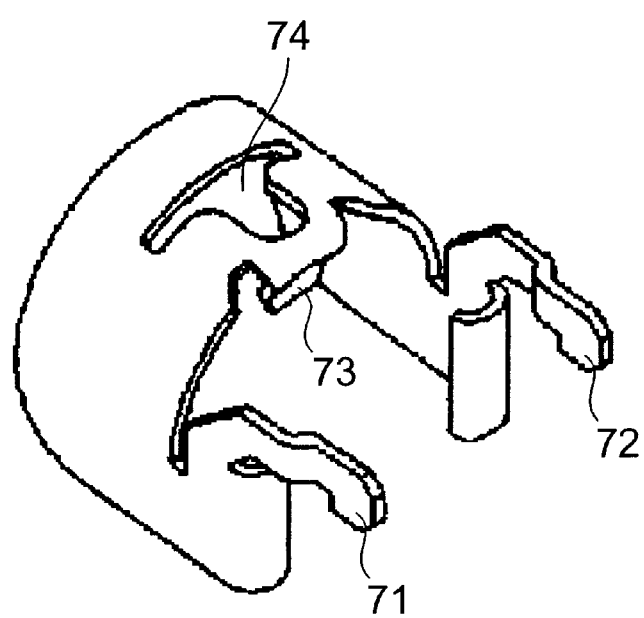

On the other hand, as shown in FIGS. 4A and 4B, the light-emitting device bracket 4 has a form in which two legs 71, 72 project from a substantially semicylindrical body 70. The body 70 has a lug 73 bent toward the inside of the body 70 on the leg 71, 72 side thereof, and a hole 74 substantially located at the center thereof. The light-emitting device bracket 7 is a bit smaller than the light-receiving device bracket 6, whereas the hole 74 of the former is formed smaller than the hole 64 of the latter.

Figure 5:
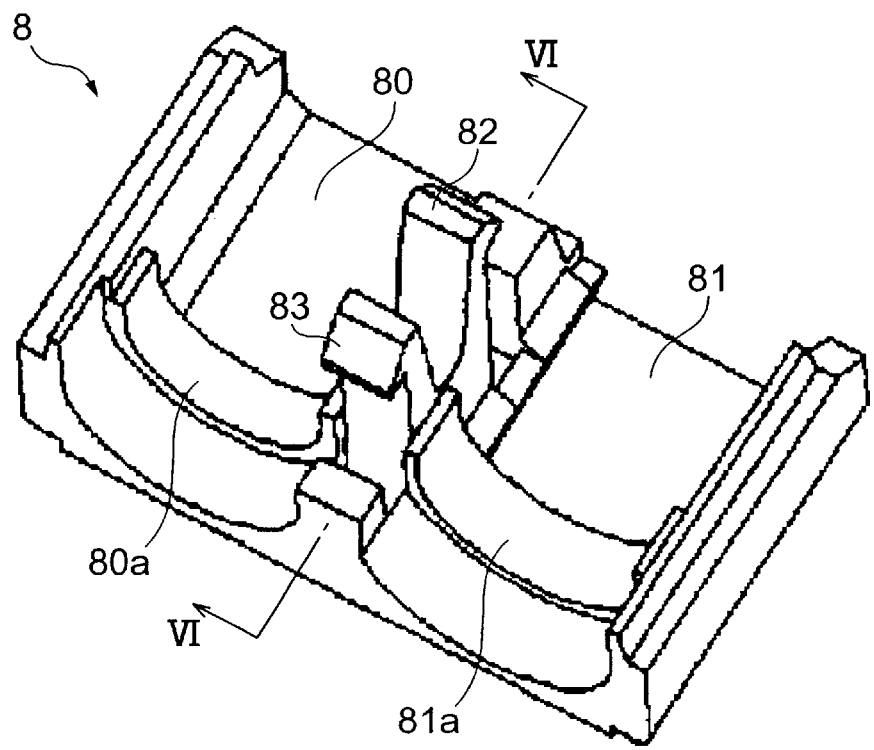
Figure 6:
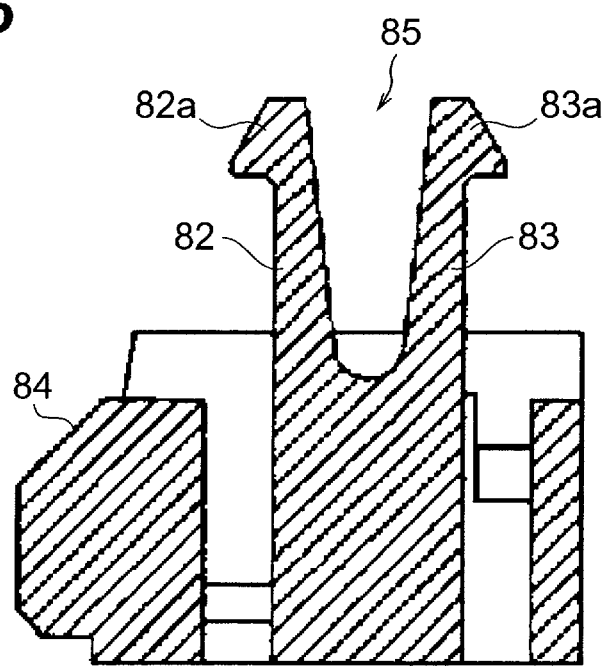
FIG. 6 is a sectional view taken along the line VI—VI of FIG. 5.

As shown in FIG. 5, the bracket holder 8 has two recesses 80, 81 arranged in parallel at one end, whereas semicylindrical projections 80a, 81a are disposed on respective extensions of the recesses 80, 81. Upwardly projecting protrusions 80a, 81a are formed between the recesses 80, 81. Respective leading ends of the protrusions 82, 83 have outwardly projecting claws 82a, 83a (see FIG. 6). A U-shaped space 85 is formed between the claws 82a, 83a. A side wall 84 of the bracket holder 8 at a side end of the recesses 80, 81 is a slope forming an angle of 40° to 80° with respect to the horizontal plane (bottom face of the recesses 82, 83). This angle is assumed to be 45° in the following explanation of this embodiment.

Figure 7:
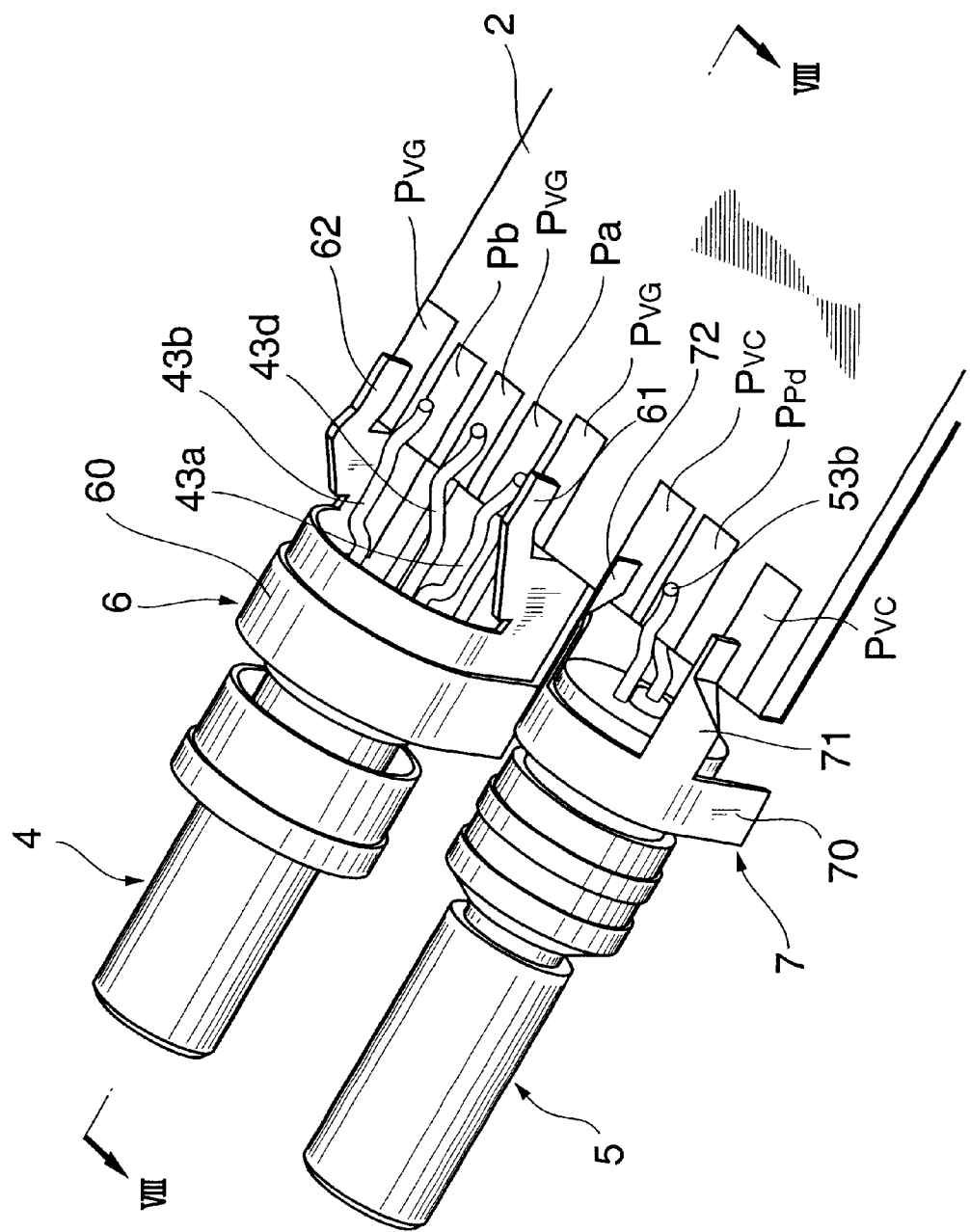
FIG. 7 is a partial perspective view showing the relationship between the light-emitting/receiving device unit, each bracket, and the circuit board in the apparatus of FIG. 1.
Figure 8:
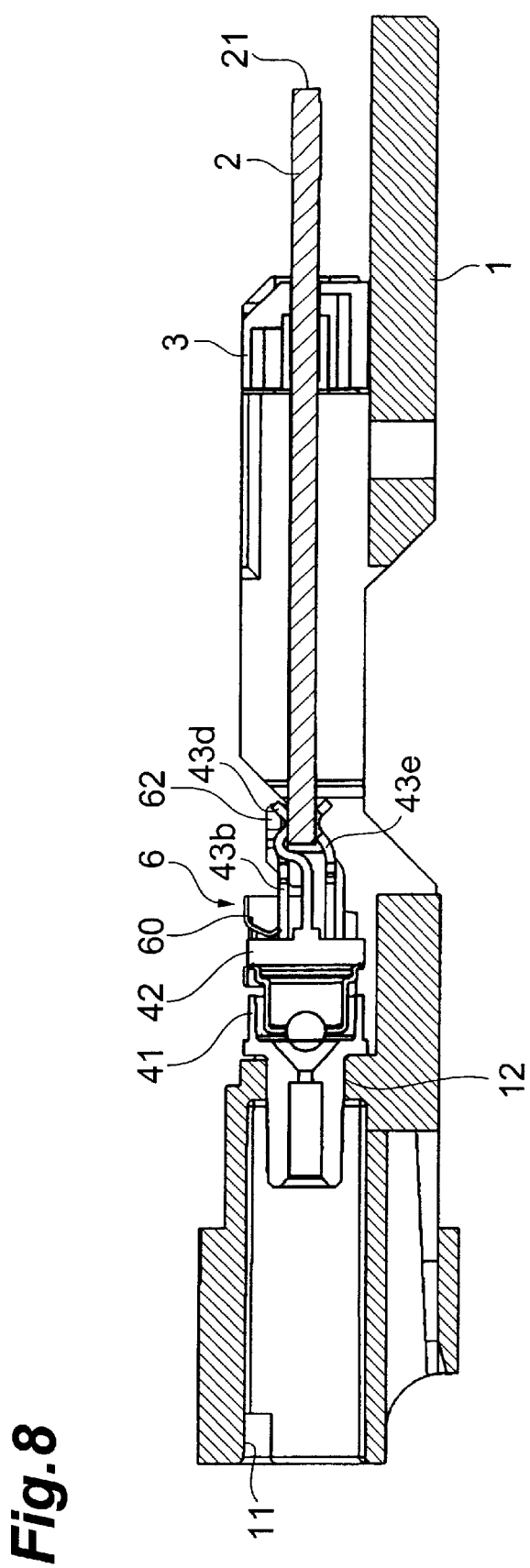
FIG. 8 is a sectional view of the apparatus of FIG. 1 taken along the line VIII—VIII of FIG. 7.
Figure 9:
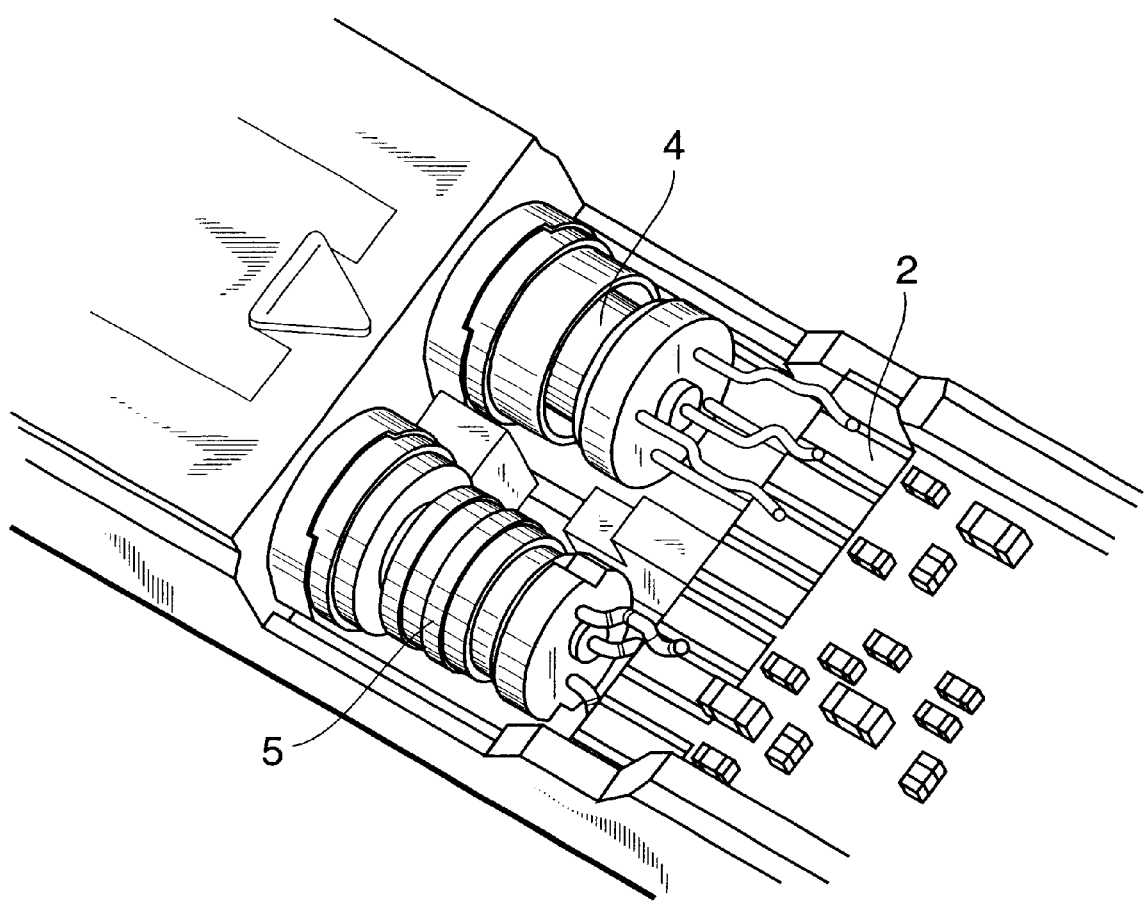
Figure 10:
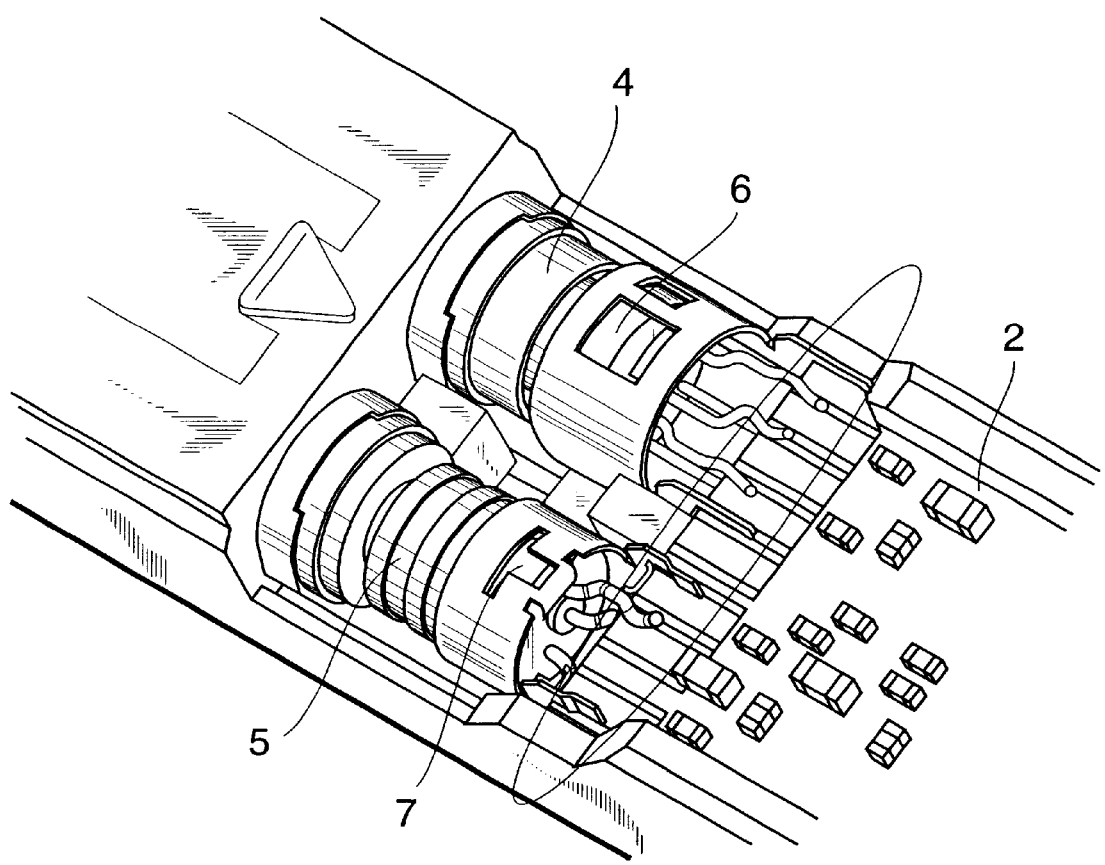

FIG. 7 is a view for explaining the state where the light-receiving device unit 4, light-emitting device unit 5, and brackets 6, 7 are attached to the circuit board 2, whereas FIG. 8 is a sectional view of FIG. 1 taken along the line VIII—VIII of FIG. 7. FIGS. 9 and 10 are perspective views showing the states where the bracket is removed and attached, respectively. As shown in FIGS. 7 to 10, an end part of the circuit board 2 opposite from the electric connector part 21 is formed with respective wiring patterns for electrically connecting with the light-receiving device unit 4 and light-emitting device unit 5 on each surface thereof. The wiring pattern to be connected to the light-receiving device unit 4 comprises five patterns arranged in parallel so as to be orthogonal to one side of the connecting end part, among which three patterns at the center and both ends are reference voltage supply patterns $P_{VG}$, whereas a normal phase signal output pattern $P_a$ and an opposite phase signal output pattern $P_b$ are formed at two locations, respectively, held among the patterns $P_{VG}$. On the other hand, the wiring pattern to be connected to the light-emitting device unit 5 comprises three patterns arranged in parallel so as to be orthogonal to one side of the connecting end part, among which the center one is a pattern $P_{pd}$ for supplying a signal corresponding to an optical signal to emit light, whereas those on both sides thereof are patterns $P_{VC}$ for supplying a reference voltage. The patterns $P_{VG}$ are connected to each other on their extensions. Also, the patterns $P_{VC}$ are connected to each other on their extensions. However, it is preferred that the patterns $P_{VG}$ and $P_{VC}$ be separated from each other.

In the light-receiving device unit 4, the lead pins 43 are arranged so as to hold the circuit board 2 therebetween. Among the lead pins 43, lead pins 43a and 43b are secured to patterns $P_a$ and $P_b$ by soldering, respectively, and the other lead pins 43c to 43e are secured to their corresponding front or rear face patterns of the circuit board 2 by soldering, so as to be electrically connected thereto. The legs 61, 62 of the light-receiving device bracket 6 are soldered to the patterns $P_{VG}$ on both sides. The body 60 is soldered to the metal enclosure 42 of the light-receiving device unit 4, thereby covering the lead pins 43.

In the light-emitting device unit 5, the lead pins 53 are arranged so as to hold the circuit board 2 therebetween. Among the lead pins 53, lead pin 53b is secured to the pattern $P_{pd}$ by soldering, and the other lead pins 53a, 53c are secured to their corresponding rear face patterns of the circuit board 2 by soldering, so as to be electrically connected thereto. The legs 71, 72 are soldered to the patterns $P_{VC}$ on both sides. The body 70 is soldered to the metal enclosure 52 of the light-emitting device unit 5, thereby covering the lead pins 53.

When the wiring patterns are arranged as such, signal lines are held between reference voltage lines, whereby the signal lines can be maintained at a low inductance, so as to reduce influences of noise upon the signal lines. Further, since the lead pins are covered with a bracket maintained at a reference voltage, their electric shielding property can be enhanced, whereby the intrusion of noise from the outside and the occurrence of crosstalk between the light-emitting device and light-receiving device can be suppressed.

The assembling of this optical transceiver will now be explained. First, the ferrules 41, 51 of the light-receiving device unit 4 and light-emitting device unit 5 are inserted into their corresponding cylindrical holes 12, 13 formed in the optical connector part 11 of the housing 1. The brackets 6, 7 are temporarily attached to the device units 4, 5 beforehand by using their protrusions 63, 73.

Figure 11A:
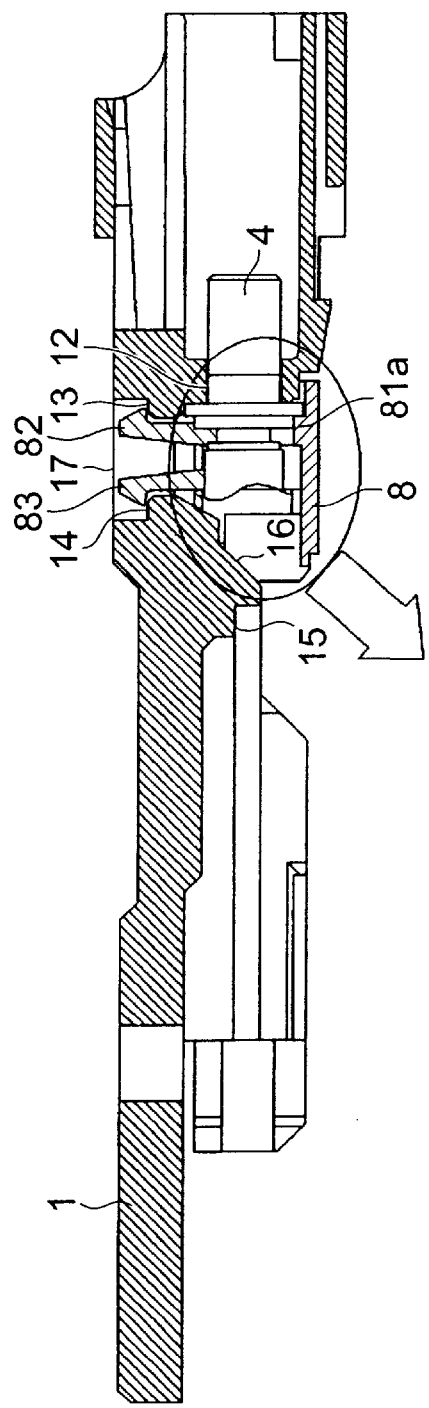

In this state, using a slit formed in the housing 1, the circuit board 2 is inserted therein from the rear side (right side in FIG. 8). When the leading end of the circuit board 2 abuts against a side wall 15 provided within the housing 1 as shown in FIG. 11A, the lead pins 43, 53 come into contact with the end part of the circuit board 2, so as to hold the end part of the circuit board 2 therebetween, whereby the light-receiving device unit 4 and the light-emitting device unit 5 are connected to the circuit board 2. In this state, no soldering is effected, whereby the lead pins 43, 53 and the legs 61, 62, 71, 72 of the brackets 6, 7 are merely in contact with their corresponding patterns of the circuit board 2. Thereafter, the stopper 3 is inserted into the circuit board 2 from the rear side thereof, so as to engage the housing 1, whereby the circuit board 2 is secured to the housing 1.

Subsequently, the bracket holder 8 is inserted such that its protrusions 82, 83 are placed between the light-receiving device unit 4 and the light-emitting device unit 5, and their claws 82a, 83a are caused to engage abutments 13, 14 provided in a cutout 17 of the housing 1, whereby the bracket holder 8 is secured to the housing 1. Here, since the U-shaped space 85 exists between the protrusions 82, 83, they can easily fit into the hole between the abutments 13, 14 while inwardly flexing. After the insertion, the protrusions 82, 83 return to their original forms by widening due to their elasticity, whereby they can reliably engage the abutments 13, 14 by using the claws 82a, 83a.

Figure 11B:
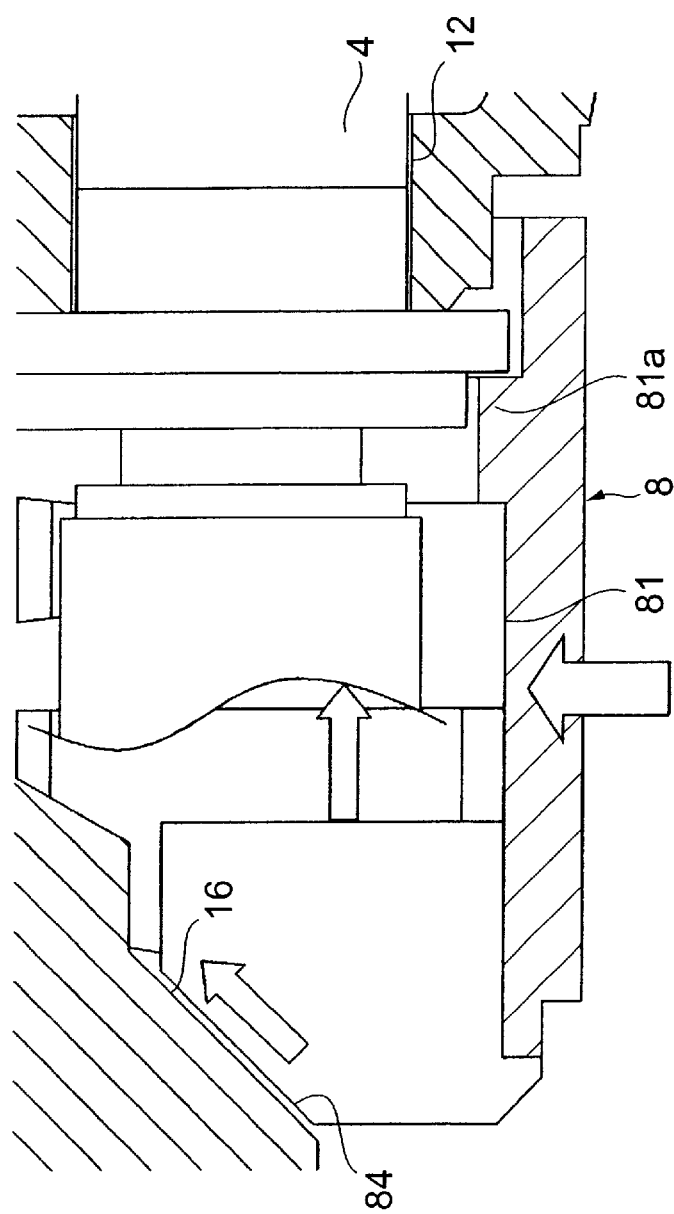
FIG. 11B is an enlarged view of a part of FIG. 11A.

When the inclined side wall 84 of the holder 8 and an inclined side wall 16 of the housing 1 are aligned with each other at the time of insertion as shown in FIG. 11B, the protrusion 81a of the holder 8 presses the flange part of the light-receiving device unit 4 so as to push it axially, whereby it can accurately be placed within the hole 12. Though not depicted, a similar relationship holds between the protrusion 82a and the light-emitting device unit 5. As a result, end face positions of the light-receiving device unit 4 and light-emitting device unit 5 within the housing 1 in the optical axis direction can accurately be defined.

If the side wall 84 forms an angle smaller than 40° with the optical axis plane (the plane formed by the respective optical axes of the light-receiving device unit 4 and light-emitting device unit 5, coinciding with the substrate surface of the circuit board 2), it will be unfavorable since the horizontal movement of the bracket holder 8 becomes greater at the time of insertion. If the angle is greater than 80°, it will be unfavorable since the pressing effect caused by the sliding becomes insufficient. Therefore, the angle is preferably within the range of 40° to 80°.

After the engagement of the bracket holder 8, the lead pins 43, 53 appearing from the rear gap of the bracket holder 8 and the legs 61, 62, 71, 72 of the brackets 6, 7 are soldered to their corresponding wiring patterns, while the bodies of brackets 6, 7 are soldered to the enclosures 42, 52 of the light-receiving device 4 and light-emitting device 5, respectively. Finally, the attenuator 10 and the case 9 are attached, so as to complete the optical transceiver.

When connecting an optical fiber having an LC connector to the optical connector 11, the LC connector engages a claw provided in the optical connector 11 of the housing 1, thereby pushing the light-receiving device unit 4 or light-emitting device unit 5 toward the board. This pressure is defined as about 15 N=about 1.5 kg. In this embodiment, the pressure is received by the side faces of protrusions 80a, 81a, so as to be absorbed within the bracket holder 8 without being transmitted to the connecting parts of lead pins 43, 53, whereby electric characteristics will not deteriorate due to damages in soldered parts. Therefore, stable performances can be maintained even upon repeated connecting operations.

Though both of the brackets 6, 7 are placed in this embodiment, the effect of improving electric characteristics can also be obtained when one of them is placed alone.

The inventors carried out tests for comparing performances with conventional products in order to verify the foregoing effect of the present invention, results of which will now be explained.

Figure 12:
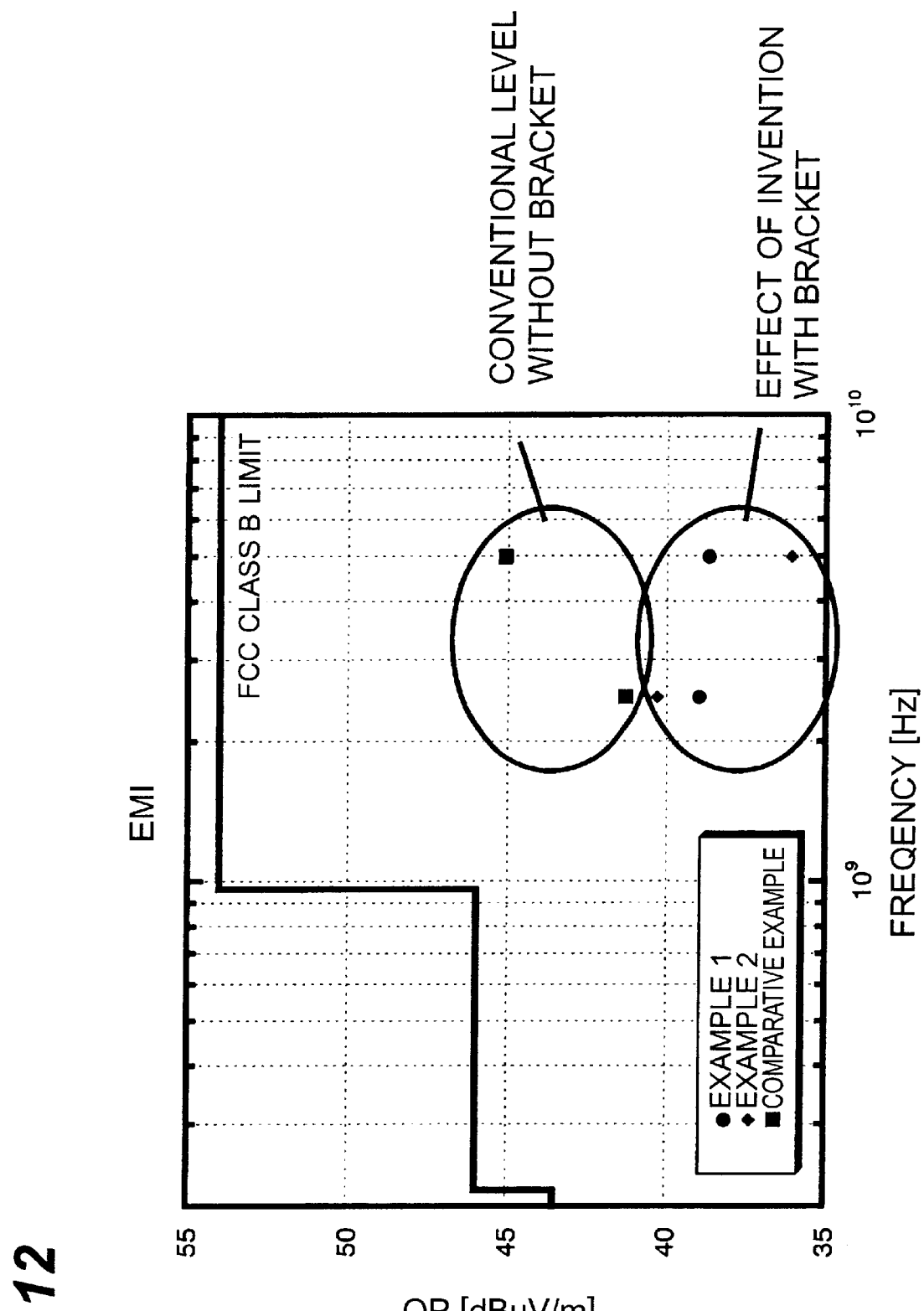

FIG. 12 is a graph showing results of EMI (electromagnetic interference) tests on the transmission side carried out for each of Comparative Example using none of the brackets 6, 7, Example 1 equipped with the light-receiving device bracket 6 alone, and Example 2 equipped with the light-emitting device bracket 7 alone. It was seen that the noise suppressing effect attained by placing a bracket was greater in a higher frequency region.

Figure 13:
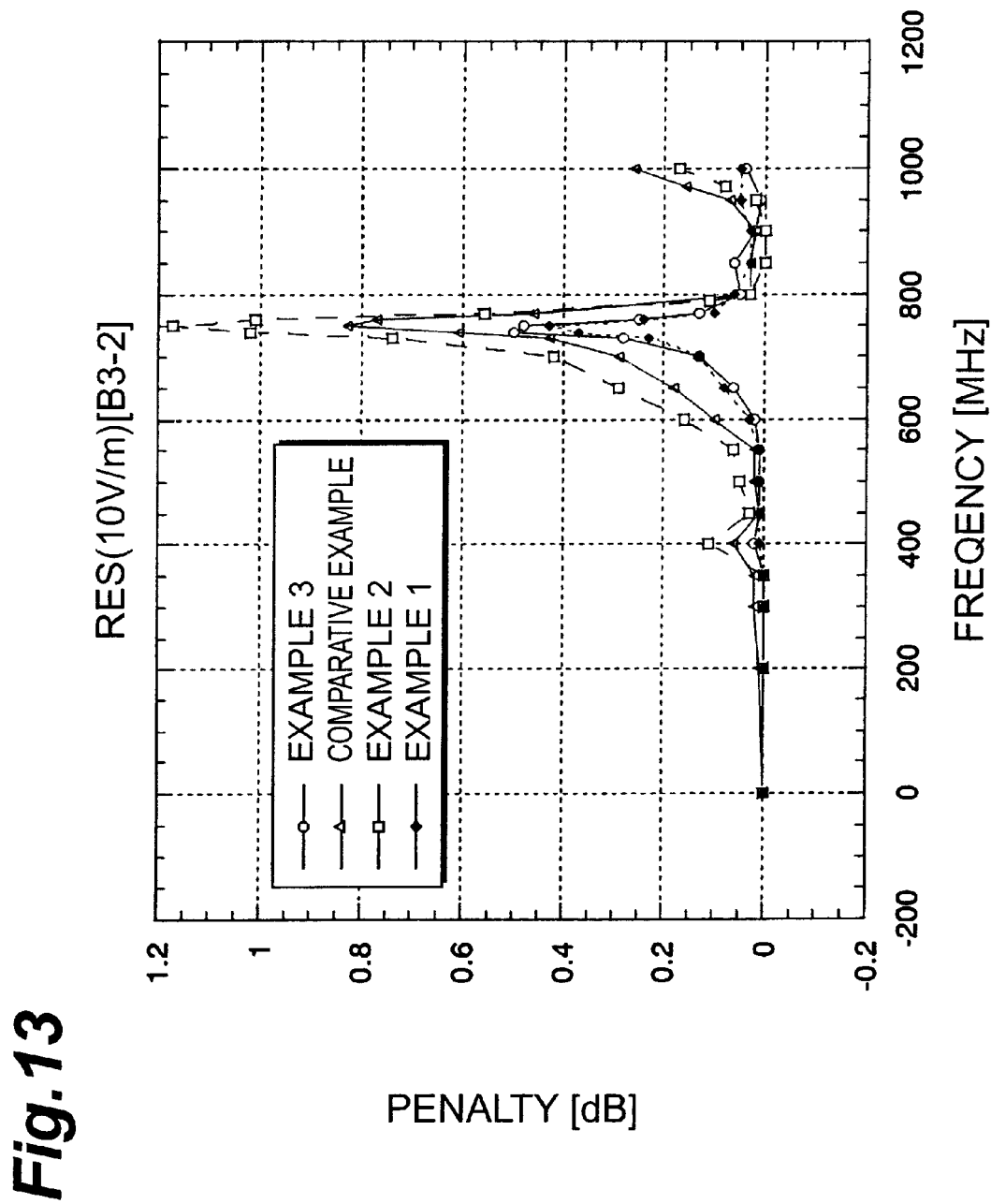
FIGS. 13 and 14 are graphs showing RES test results comparing these apparatus.
Figure 14:
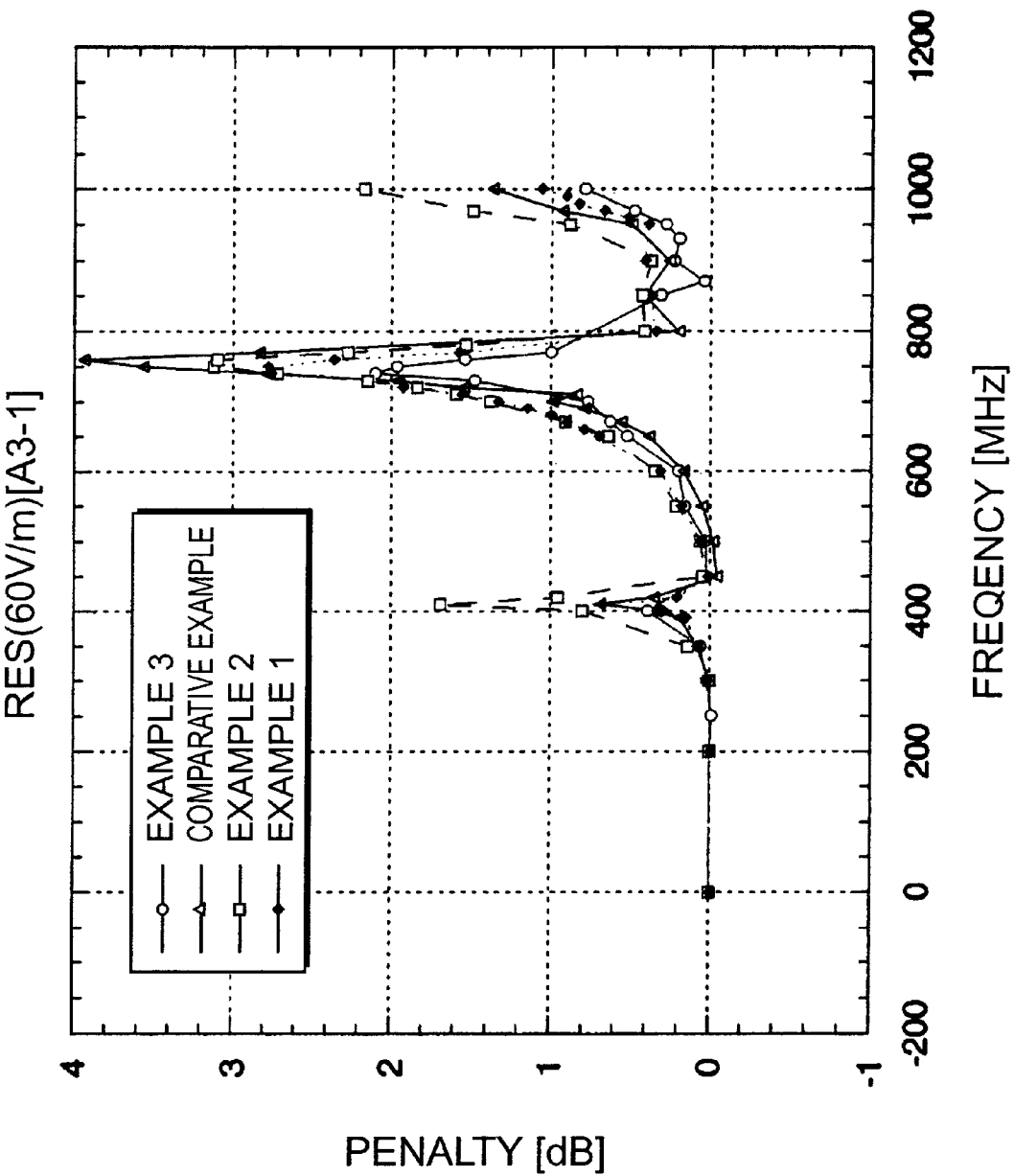

FIGS. 13 and 14 are graphs showing results of RES characteristic tests on the reception side concerning Example 3 equipped with both of the brackets 6, 7 and the above-mentioned Examples 1, 2 and Comparative Example. As shown in the graph, the effect of improving RES characteristics was seen when placing a bracket on the reception side in particular.

Figure 15B:
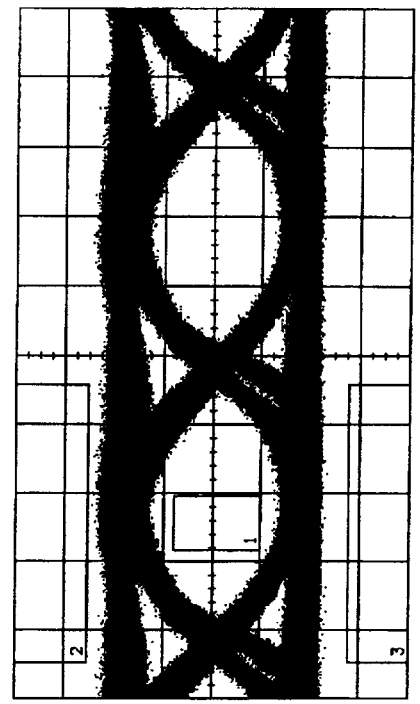
FIG. 15B is a chart showing a waveform transmitted by a conventional apparatus.
Figure 15A:
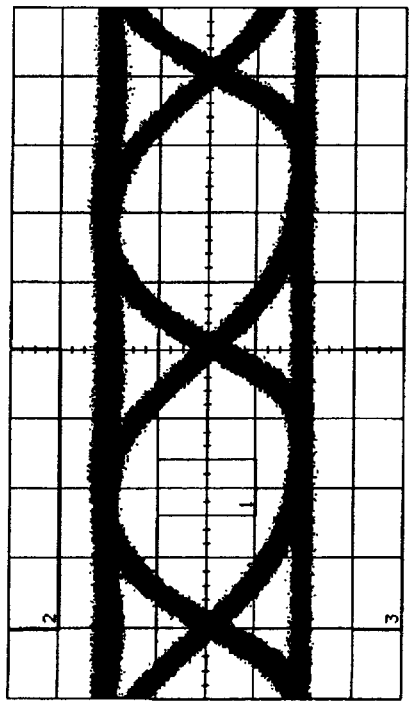

FIGS. 15A and 15B are charts comparing the transmission waveform (FIG. 15A) in Example 3 and the transmission waveform (FIG. 15B) in Comparative Example. It was seen that Example 3 yielded a transmission waveform more stable than that in Comparative Example due to the designing of brackets and wiring patterns, thereby suppressing the crosstalk amount to 0.38 dB from 0.92 dB of Comparative Example.

Figure 16:
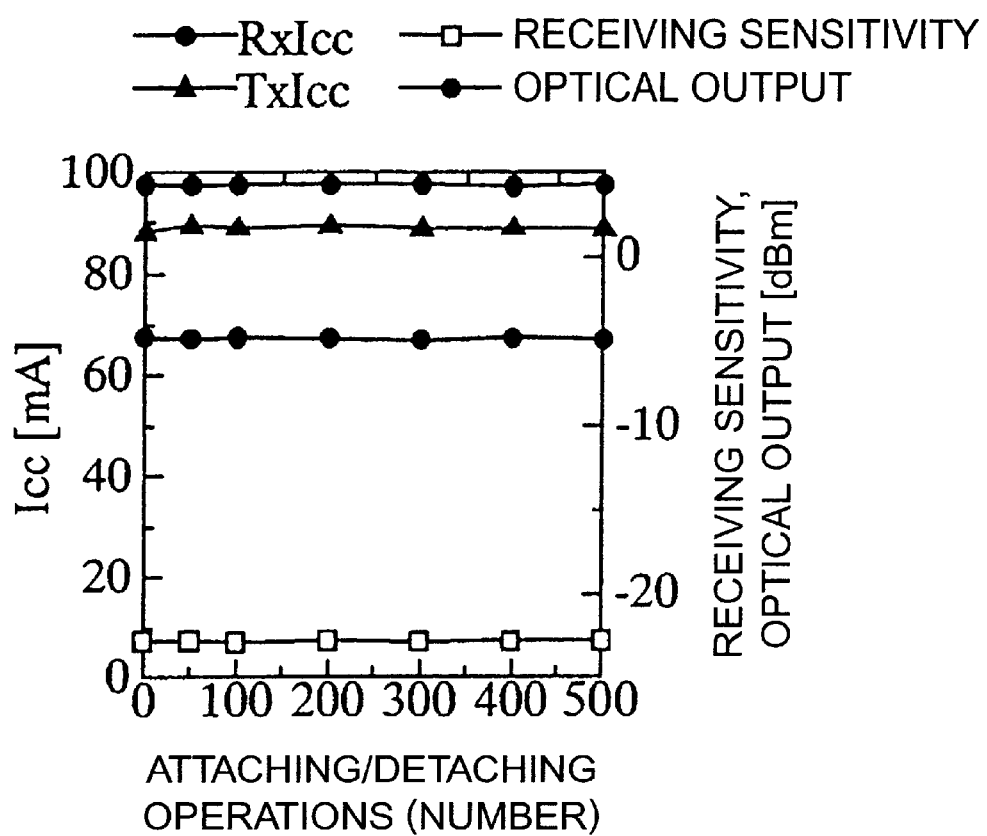
Figure 17:
FIG. 17 is a chart summarizing changes in the received waveform, transmitted waveform, and connector surface vs. the number of connector attaching/detaching operations in the apparatus of FIG. 1.

FIGS. 16 and 17 are charts showing changes in performances vs. the number of attaching/detaching operations in the case where electric and optical connectors are repeatedly attached/detached in Example 3. As can be seen from FIGS. 16 and 17, characteristics in Example 3 hardly changed between before and after 500 attaching/detaching operations, thus exhibiting a sufficient resistance to a number of attaching/detaching operations.

Without being restricted to optical transceivers of SFP and SFF types, the present invention is favorably applicable to various kinds of optical modules having a lead pin structure.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical module comprising, within a housing, a substrate having an electronic circuit, and light-emitting and light-receiving device units each having an optical output or input end connected to said electronic circuit;

wherein said light-emitting device unit and said light-receiving device unit have respective cylindrical leading end parts accommodated in substantially cylindrical holes within said housing and respective flange parts having diameters greater than those of said leading end parts, said housing having an inclined wall behind said substantially cylindrical holes; and wherein said optical module further comprises a pressing member having a protrusion for pressing said flange parts of said light-emitting device unit and light-receiving device unit against said housing so as to secure said units, said pressing member engaging said housing while being slid along said inclined wall of said housing by a slanted wall provided so as to correspond to said inclined wall.

2. An optical module according to claim 1, wherein said pressing member engages a cutout of said housing by way of an elastic protrusion having a claw at a leading end thereof.

3. An optical module according to claim 1, wherein said tilted wall has a wall face forming an angle of 40° to 80° with respect to a horizontal plane of said substrate.

* * * * *